United States Patent
Huang et al.

(10) Patent No.: US 12,222,617 B2
(45) Date of Patent: Feb. 11, 2025

(54) ARRAY SUBSTRATE AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianhua Huang, Beijing (CN); Chongyang Zhao, Beijing (CN); Zhihua Sun, Beijing (CN); Yingmeng Miao, Beijing (CN); Yingying Qu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 268 days.

(21) Appl. No.: 17/441,304

(22) PCT Filed: Feb. 2, 2021

(86) PCT No.: PCT/CN2021/074940
§ 371 (c)(1),
(2) Date: Sep. 21, 2021

(87) PCT Pub. No.: WO2021/190159
PCT Pub. Date: Sep. 30, 2021

(65) Prior Publication Data
US 2022/0317530 A1    Oct. 6, 2022

(30) Foreign Application Priority Data

Mar. 24, 2020    (CN) .......................... 202010213325.3

(51) Int. Cl.
*G02F 1/1362*    (2006.01)
*G02F 1/1368*    (2006.01)

(52) U.S. Cl.
CPC ...... *G02F 1/136286* (2013.01); *G02F 1/1368* (2013.01)

(58) Field of Classification Search
CPC ............... G02F 1/1368; G02F 1/13452; G02F 1/136286; G02F 1/134372; G02F 1/13458;
(Continued)

(56) References Cited

U.S. PATENT DOCUMENTS

| 10,571,563 B2 | 2/2020 | Asanuma |
|---|---|---|
| 10,571,763 B2 | 2/2020 | Asanuma |

(Continued)

FOREIGN PATENT DOCUMENTS

| CN | 106169482 A | 11/2016 |
|---|---|---|
| CN | 107945726 A | 4/2018 |

(Continued)

OTHER PUBLICATIONS

International Search Report from PCT/CN2021/0749490 dated May 11, 2021.
(Continued)

*Primary Examiner* — Hoan C Nguyen
(74) *Attorney, Agent, or Firm* — Calfee, Halter & Griswold LLP (57) ABSTRACT

The present disclosure relates to the field of display technology, and in particular, to an array substrate and a display apparatus. The array substrate has a display area and a peripheral wiring area provided at at least one side of the display area. The display area includes a thin film transistor and a common electrode formed on the base substrate; the peripheral wiring area includes a first lead, a gate signal line and a common signal line formed on the base substrate; the first lead and the gate electrode of the thin film transistor are arranged in an identical layer and are electrically connected;
(Continued)

the gate signal line is located on a side of the first lead away from the base substrate, and is electrically connected to the first lead through a first transition structure.

15 Claims, 3 Drawing Sheets

(58) Field of Classification Search
CPC .............. G02F 1/1309; G02F 1/1345; G02F 1/136213; G02F 1/133555; G02F 1/136259; G02F 1/134336; G02F 1/134363; G02F 1/13454; G02F 1/13624; H01L 27/124; H01L 27/1214; H01L 27/12; H01L 29/786; G09G 3/006
See application file for complete search history.

(56) References Cited

U.S. PATENT DOCUMENTS

| 2002/0051114 | A1* | 5/2002 | Kwak | G02F 1/1309 349/192 |
| 2002/0113934 | A1* | 8/2002 | Aoki | H01L 27/124 349/149 |
| 2006/0067143 | A1* | 3/2006 | Kim | H01L 27/124 365/201 |
| 2009/0016001 | A1* | 1/2009 | Miyakawa | G02F 1/133555 445/25 |
| 2009/0206339 | A1* | 8/2009 | Park | G02F 1/136213 257/E27.06 |
| 2010/0033664 | A1* | 2/2010 | Lee | G02F 1/1345 349/139 |
| 2012/0153310 | A1* | 6/2012 | Kwak | G02F 1/134363 257/E21.531 |
| 2017/0184935 | A1* | 6/2017 | Park | G02F 1/133345 |
| 2019/0155112 | A1 | 5/2019 | Yu et al. | |
| 2020/0064700 | A1* | 2/2020 | Cheng | G02F 1/136204 |

FOREIGN PATENT DOCUMENTS

| CN | 109491161 | A | | 3/2019 |
| CN | 109782502 | A | | 5/2019 |
| CN | 110888278 | A | | 3/2020 |
| CN | 111427206 | A | | 7/2020 |
| EP | 3491670 | A1 | | 6/2019 |
| EP | 3491670 | A4 | | 2/2020 |
| JP | 2011017821 | A | | 1/2011 |
| JP | 2011017822 | A | | 1/2011 |
| JP | 2011071822 | A | | 1/2011 |
| JP | 5302122 | B2 | | 10/2013 |
| KR | 20120113942 | A | * | 10/2012 |
| WO | 2018024054 | A1 | | 2/2018 |
| WO | 2020147479 | A1 | | 7/2020 |

OTHER PUBLICATIONS

Written Opinion from PCT/CN2021/074940 dated May 11, 2021.
International Search Report from PCT/CN2021/074940 dated May 11, 2021.

* cited by examiner

ARRAY SUBSTRATE AND DISPLAY APPARATUS

CROSS REFERENCE

The present application is the national stage entry of PCT/CN2021/074940, filed on Feb. 2, 2021, this disclosure claims the priority of a Chinese patent application entitled "Array Substrate and Display Apparatus" with the application No. 202010213325.3, filed on Mar. 24, 2020, and the entire contents of both patent applications are incorporated herein by reference in their entirety.

TECHNICAL FIELD

The present disclosure relates to the field of display technology, and in particular, to an array substrate and a display apparatus.

BACKGROUND

With the continuous development of display technology, Thin Film Transistor Liquid Crystal Display (TFT-LCD) has taken a leading position in the field of the flat panel display.

However, at present, the inventor found in the research that the periphery of the display area in the TFT-LCD is prone to rubbing alignment shadows and uneven liquid crystal diffusion under the influence of the peripheral wiring area, which makes the periphery of the display area cannot display normally, produces the peripheral dark state light leakage or the bright state dark area and other undesirable conditions, and reduces the yield of the display products.

It should be noted that the information disclosed in the above BACKGROUND is only used to enhance the understanding of the background of the present disclosure, and therefore may include information that does not constitute the prior art known to those of ordinary skill in the art.

SUMMARY

The purpose of the present disclosure is to provide an array substrate and a display apparatus to improve the yield of display products.

According to one aspect of the present disclosure, there is provided an array substrate, having a display area and a peripheral wiring area provided at at least one side of the display area, wherein the array substrate includes a base substrate, and the display area includes a thin film transistor and a common electrode formed on the base substrate; the peripheral wiring area includes a first lead, a gate signal line and a common signal line formed on the base substrate;
- the thin film transistor includes a gate electrode, and the first lead and the gate electrode are arranged in an identical layer and are electrically connected;
- the gate signal line is located on a side of the first lead away from the base substrate, and is electrically connected to the first lead through a first transition structure;
- the common signal line is located on a side of the first lead away from the base substrate and located on a side of the gate signal line close to the display area, and the common signal line is electrically connected to the common electrode,
- wherein, the first transfer structure is located on a side of the common signal line away from the display area.

In an exemplary embodiment of the present disclosure, the first transfer structure includes:
- at least one first via hole, wherein an orthographic projection of the first via hole on the base substrate is located within an orthographic projection of the gate signal line on the base substrate, and the first via hole exposes at least a part of the gate signal line;
- at least one second via hole, wherein an orthographic projection of the second via hole on the base substrate is located within an orthographic projection of the first lead on the base substrate, and the second via hole exposes at least a part of the first lead;
- a first transfer portion, located on a side of the gate signal line away from the base substrate, wherein the first transfer portion is electrically connected to the gate signal line through the first via hole, and is electrically connected to the first lead through the second via hole.

In an exemplary embodiment of the present disclosure, the common signal line and the gate signal line extend in a first direction;
- the first lead includes a first transfer lead segment extending in the first direction and a first main lead segment extending in a second direction, an orthographic projection of the first transfer lead segment on the base substrate is located between an orthographic projection of the gate signal line on the base substrate and an orthographic projection of the common signal line on the base substrate; the first main lead segment is electrically connected to the first transfer lead segment and the gate electrode of the thin film transistor respectively, and an orthographic projection of the first main lead segment on the base substrate overlaps the orthographic projection of the common signal line on the base substrate,
- wherein, the orthographic projection of the second via hole on the base substrate is located within the orthographic projection of the first transfer lead segment on the base substrate; and the second direction intersects with the first direction.

In an exemplary embodiment of the present disclosure, a plurality of the first via holes are provided and arranged at intervals in the first direction;
- a plurality of the second via holes are provided and arranged at intervals in the first direction.

In an exemplary embodiment of the present disclosure, the display area further includes a pixel electrode, the thin film transistor includes a drain electrode, and the pixel electrode is located on a side of the drain electrode away from the base substrate and is connected to the drain electrode;
- the first transfer portion and the pixel electrode are provided in an identical layer.

In an exemplary embodiment of the present disclosure, the peripheral wiring area further includes a second lead formed on the base substrate, and the second lead is provided on an identical layer with the gate electrode and is electrically connected to the common electrode;
- the common signal line is electrically connected to the second lead through a second transfer structure,
- wherein, the second transfer structure is located on a side of the common signal line away from the display area.

In an exemplary embodiment of the present disclosure, the second transfer structure includes:
- at least one third via hole, wherein an orthographic projection of the third via hole on the base substrate is located within an orthographic projection of the common signal line on the base substrate, and the third via hole exposes at least a part of the common signal line;

at least one fourth via hole, wherein an orthographic projection of the fourth via hole on the base substrate is located within an orthographic projection of the first lead on the base substrate, and the fourth via hole exposes at least a part of the second lead;

a second transfer portion, located on a side of the common signal line away from the base substrate, wherein the second transfer portion is electrically connected to the common signal line through the third via hole, and is electrically connected to the second lead through the fourth via hole.

In an exemplary embodiment of the present disclosure, the common signal line and the gate signal line extend in the first direction;

the second lead includes a second transfer lead segment extending in the first direction and a second main lead segment extending in a second direction, an orthographic projection of the second transfer lead segment on the base substrate is located between an orthographic projection of the gate signal line on the base substrate and an orthographic projection of the common signal line on the base substrate; the second main lead segment is electrically connected to the second transfer lead segment and the common electrode respectively, and an orthographic projection of the second main lead segment on the base substrate overlaps the orthographic projection of the common signal line on the base substrate, wherein, the orthographic projection of the fourth via hole on the base substrate is located within the orthographic projection of the second transfer lead segment on the base substrate; and the second direction intersects with the first direction.

In an exemplary embodiment of the present disclosure, a plurality of the third via holes are provided and arranged at intervals in the first direction;

a plurality of the fourth via holes are provided and arranged at intervals in the first direction.

In an exemplary embodiment of the present disclosure, the display area further includes a pixel electrode, the thin film transistor includes a drain electrode, and the pixel electrode is located on a side of the drain electrode away from the base substrate and is connected to the drain electrode of the thin film transistor;

the second transfer portion and the pixel electrode are provided in an identical layer.

In an exemplary embodiment of the present disclosure, the thin film transistor includes a source electrode and a drain electrode, and the gate signal line, the common signal line, the source electrode and the drain electrode are arranged in an identical layer.

According to one aspect of the present disclosure, there is provided a display apparatus, including the array substrate according to any one of the above.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the disclosure, and explain the principle of the disclosure together with the specification. The drawings in the following description are only some embodiments of the present disclosure. For those of ordinary skill in the art, other drawings can be obtained based on these drawings without creative work.

DETAILED DESCRIPTION

In the following, the technical solutions of the present disclosure will be further described in detail through embodiments in conjunction with the accompanying drawings. In the specification, the same or similar reference numerals indicate the same or similar components. The following description of the embodiments of the present disclosure with reference to the accompanying drawings is intended to explain the general inventive concept of the present disclosure, and should not be construed as a limitation to the present disclosure.

In addition, in the following detailed description, for the convenience of explanation, many specific details are set forth to provide a comprehensive understanding of the embodiments of the present disclosure. However, one or more embodiments can also be implemented without these specific details.

It should be noted that "on", "formed on" and "disposed on" in this specification may mean that one layer is directly formed or disposed on another layer, or it may also mean that a layer is indirectly formed or arranged on another layer, that is, there are other layers between the two layers.

The terms "a", "an", "the", "said" and "at least one" are used to indicate the presence of one or more elements/components/etc.; the terms "including" and "having" are used to indicate open-ended inclusive meaning and means that there may be additional elements/components/etc. in addition to the listed elements/components/etc.

It should be noted that although the terms "first", "second", "third", "fourth", etc. may be used herein to describe various components, members, elements, regions, layers and/or parts, these parts, components, elements, regions, layers and/or parts should not be limited by these terms. Rather, these terms are used to distinguish one component, member, element, region, layer, and/or part from another component, member, element, region, layer, and/or part.

In the present disclosure, unless otherwise specified, the term "arranged in an identical layer/arranged in the same layer" means that two layers, parts, components, elements or parts can be formed by the same patterning process, and the two layers, parts, components, elements or parts are generally formed of the same material.

In the present disclosure, unless otherwise specified, the expression "patterning process" generally includes the steps of photoresist coating, exposure, development, etching, and photoresist stripping. The expression "one-time patterning process" means a process of forming patterned layers, parts, components, or the like by using one mask.

The embodiments of the present disclosure provide an array substrate, which can be applied to a liquid crystal display device, and the array substrate can adopt the Gate Driver On Array (GOA) technology.

Figure 2:
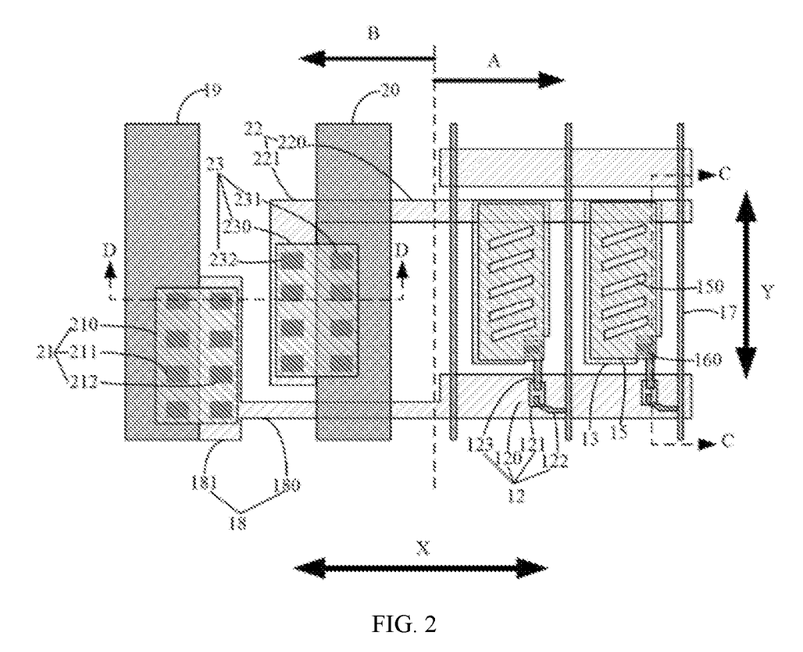
FIG. 2 shows a schematic diagram of the structure of each layer of an array substrate provided by an embodiment of the present disclosure.

As shown in FIG. 2, the array substrate may have a display area A and a peripheral wiring area B provided at at least one side of the display area A, and the array substrate includes a base substrate 11.

In the embodiment, the display area A may include a thin film transistor 12 and a common electrode 13 formed on the base substrate 11. The thin film transistor 12 may include a gate electrode 120, an active layer 121, a source electrode 122, and a drain electrode 123. It should be noted that a first insulating layer 14 may also be provided between the gate electrode 120 and the active layer 121, to make the gate electrode 120 and the active layer 121 insulated from each other. The first insulating layer 14 can be made of inorganic materials, such as silicon oxide, silicon nitride.

Figure 3:
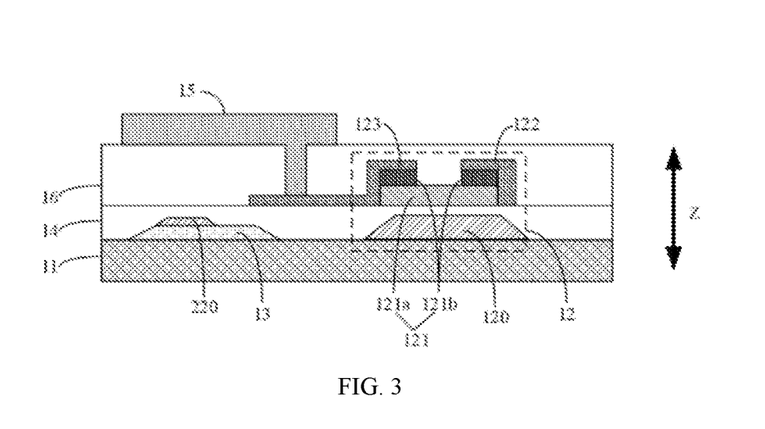
FIG. 3 shows a schematic cross-sectional view of the array substrate shown in FIG. 2 in the C-C direction.

It should be noted that the thin film transistor 12 may be a top gate type or a bottom gate type. In the embodiments of the present disclosure, the thin film transistor 12 of a bottom gate type is taken as an example for description. As shown in FIGS. 2 and 3, when the thin film transistor 12 is of a bottom gate type, the gate electrode 120 is formed on the base substrate 11. The gate electrode 120 may include metal materials or alloy materials, such as molybdenum, aluminum, and titanium, to ensure its good electrical conductivity. The first insulating layer 14 is formed on the base substrate 11 and covers the gate electrode 120. The first insulating layer 14 can be made of inorganic materials, such as silicon oxide, silicon nitride. The active layer 121 is formed on a side of the first insulating layer 14 away from the base substrate 11, and the active layer 121 may include a hydrogenated amorphous silicon (a-Si:H) layer 121a and high concentration doped N-type conductive layer 121b formed at two ends of the hydrogenated amorphous silicon layer 121a. The source electrode 122 and the drain electrode 123 are respectively connected to the high concentration doped N-type conductive layer 121b at two ends of the active layer 121. The source electrode 122 and the drain electrode 123 can include metal materials or alloy materials, such as a metal single-layer or multi-layer structure formed of molybdenum, aluminum, and titanium. For example, the multi-layer structure is a multi-metal laminate layer, such as a three-layer metal laminate layer of titanium, aluminum, and titanium (Al/Ti/Al).

In order to ensure the light transmittance of the display area A, the common electrode 13 can be made of transparent materials such as ITO (Indium Tin Oxide), Indium Zinc Oxide (IZO), Zinc Oxide (ZnO). That is, since the material adopted by the common electrode 13 is different from that of the gate electrode 120, the source electrode and the drain electrode of the thin film transistor 12, the common electrode 13 can be fabricated by a different patterning process from the gate electrode 120, the source electrode and the drain electrode of the thin film transistor 12.

For example, as shown in FIGS. 2 and 3, the common electrode 13 of this embodiment may be formed on the base substrate 11 before the gate electrode 120 of the thin film transistor 12 is formed. That is, when the array substrate is fabricated, a one-time patterning process is firstly used to form the common electrode 13 on the base substrate 11, and then another patterning process is used to form the gate electrode 120 of the thin film transistor 12 on the base substrate 11. It should be noted that although the common electrode 13 and the gate electrode 120 are both formed on the base substrate 11, the common electrode 13 and the gate electrode 120 are disconnected from each other, that is, there is no electrical connection between the common electrode 13 and the gate electrode 120.

However, it should be understood that when the material of the gate electrode 120 and the material of the common electrode 13 are the same, the gate electrode 120 and the common electrode 13 can also be formed on the base substrate 11 at the same time by one-time patterning process. In addition, the common electrode 13 may be formed on the base substrate 11 not only before the gate electrode 120 of the thin film transistor 12 is formed, but also after the gate electrode 120 of the thin film transistor 12 is formed, which depends on specific circumstances.

In addition, as shown in FIGS. 2 and 3, the display area A may also include a pixel electrode 15. In order to ensure the light transmittance of the display area A, the pixel electrode 15 may be made of transparent materials, such as ITO (Indium Tin Oxide), Indium Zinc Oxide (IZO), zinc oxide (ZnO). The pixel electrode 15 can be formed on the side of the source electrode 122 and the drain electrode 123 away from the base substrate 11; and the pixel electrode 15 can be connected to the drain electrode 123. It should be understood that, after the source electrode 122 and the drain electrode 123 are formed, and before the pixel electrode 15 is formed, a second insulating layer 16 can also be formed. In order to realize the connection between the pixel electrode 15 and the drain electrode 123, an opening 160 may be provided on the second insulating layer 16. The opening 160 can expose at least a part of the surface of the drain electrode 123, and the pixel electrode 15 can be electrically connected to the drain electrode 123 through the opening 160.

For example, the pixel electrode 15 and the common electrode 13 may be oppositely designed in a direction perpendicular to the base substrate 11, for example, the Z direction as shown in FIG. 3. The pixel electrode 15 may be a slit electrode (i.e., a slit 150 is provided on the electrode), and the common electrode 13 can be a plate electrode (i.e., the electrode is a whole piece without slits). The electric field generated by the pixel electrode 15 and the electric field generated by the common electrode 13 in the same plane form a multidimensional electric field, which deflects liquid crystal molecules between the electrodes and liquid crystal molecules directly above the electrodes, which can improve the working efficiency of the liquid crystals and increase the light transmission efficiency. But the present disclosure is not limited to this, the pixel electrode 15 and the common electrode 13 can also be arranged in other structures, depending on the specific situation.

The pixel electrode 15, the common electrode 13, and the thin film transistor 12 can form a pixel unit, and the display area A can have a plurality of pixel units arranged in an array.

As shown in FIG. 2, the display area A may further include a data line 17. The data line 17 may extend in the first direction Y (i.e., the column direction), and there may be a plurality of data lines 17. The plurality of data lines 17 are arranged at intervals in the second direction X. The second direction X may intersect with the first direction Y, and optionally, the second direction X is orthogonal to the first direction Y. The data line 17 may include metal materials or alloy materials, such as molybdenum, aluminum, titanium, to ensure its good electrical conductivity. In some embodiments, the data line 17 may be arranged in the same layer as the source electrode 122 and the drain electrode 123 of the thin film transistor 12, and is electrically connected to the source electrode 122.

Figure 4:
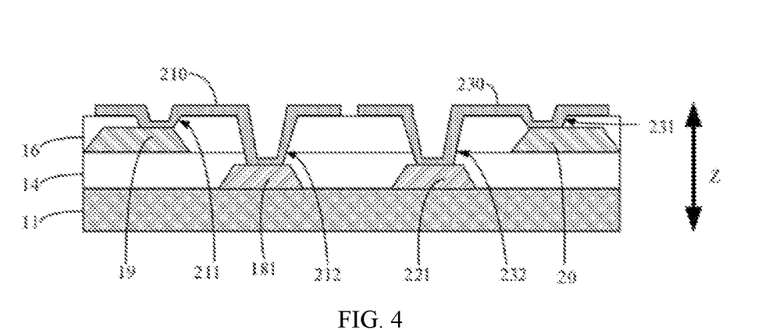
FIG. 4 shows a schematic cross-sectional view of the array substrate shown in FIG. 2 in the D-D direction.

As shown in FIGS. 2 and 4, the peripheral wiring area B may include a first lead 18, a gate signal line 19 and a common signal line 20 formed on the base substrate 11.

The first lead 18 is provided in the same layer as the gate electrode 120 of the thin film transistor 12 and is electrically connected to the gate electrode 120.

The gate signal line 19 may extend in the first direction Y The gate signal line 19 can be located on the side of the first lead 18 away from the base substrate 11. It should be understood that an insulating material layer needs to be provided between the first lead 18 and the gate signal line 19. That is, after the first lead 18 is formed and before the gate signal line 19 is formed, an insulating material layer needs to be further formed. When the gate signal line 19 and the source electrode 122, the drain electrode 123 of the thin film transistor 12 are arranged in the same layer, the insulating material layer between the first lead 18 and the gate signal line 19 may be the first insulating layer 14. It should be noted that, in order to realize the transmission of signals from the gate signal line 19 to the gate electrode 120 of the thin film transistor 12, the gate signal line 19 and the first lead 18 need to be electrically connected. Since a first insulating layer 14 is provided between the first lead 18 and the gate signal line 19, a first transfer structure 21 can be provided in the peripheral wiring area B, and the gate signal line 19 can be electrically connected to the first lead 18 through the first transfer structure 21.

The common signal line 20 may extend in the first direction Y The common signal line 20 may include a VDD power line, a VSS power line, or the like. The common signal line 20 may be located at a side of the gate signal line 19 close to the display area A, and the common signal line 20 may be electrically connected to the common electrode 13. Since the peripheral wiring area B is provided with the first lead 18 arranged on the same layer as the gate electrode 120 of the thin film transistor 12, in order to avoid the cross-linking of the common signal line 20 and the first lead 18, the common signal line 20 can be arranged on a side of the first lead 18 away from the base substrate 11. It should be understood that an insulating material layer needs to be provided between the common signal line 20 and the first lead 18. That is, after the first lead 18 is formed and before the common signal line 20 is formed, an insulating material layer further needs to be formed. When the common signal line 20 and the source electrode 122, the drain electrode 123 of the thin film transistor 12 are arranged in the same layer, the insulating material layer between the first lead 18 and the common signal line 20 may be the first insulating layer 14.

Figure 1:
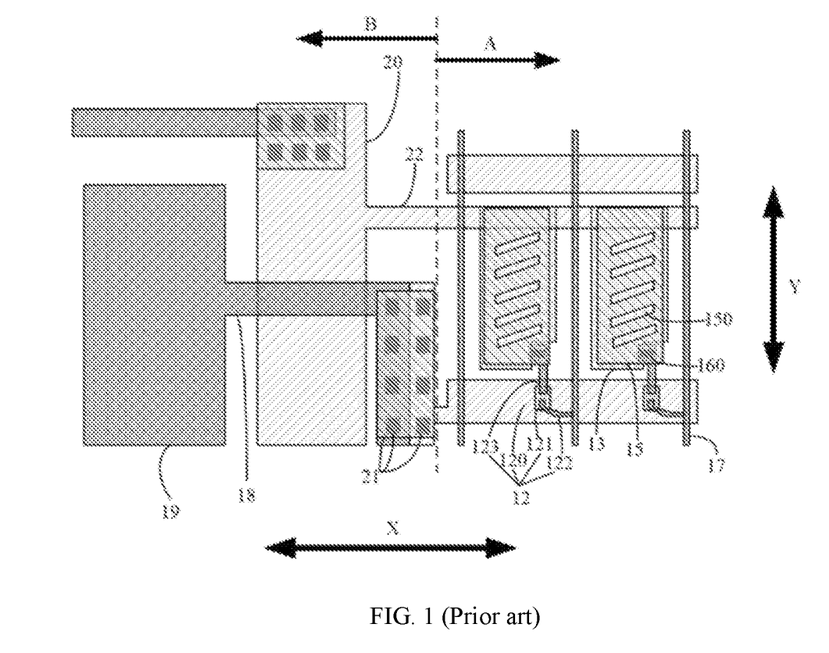
FIG. 1 shows a schematic diagram of the structure of each layer of an array substrate in the related art.

In the embodiment of the present disclosure, the first lead 18 and the gate electrode 120 of the thin film transistor 12 are arranged in the same layer, and the common signal line 20 is arranged on the side of the first lead 18 away from the base substrate 11, compared with the technical solution of the related art where the common signal line 20 and the gate electrode 120 of the thin film transistor 12 are arranged in the same layer, and the first lead 18 is arranged on the side of the common signal line 20 away from the base substrate 11 (as shown in FIG. 1), on the one hand, it can avoid the cross-linking of the common signal line 20 and the first lead 18, and on the other hand, the first transfer structure 21 can be designed on the side of the common signal line 20 away from the display area A.

By arranging the first transfer structure 21 for connecting the gate signal line 19 and the first lead 18 on the side of the common signal line 20 away from the display area A, it can ensure that the gate signal line 19 can control the on-off of the thin film transistor 12 in the display area A, and it can also increase the distance between the first transfer structure 21 and the display area A, compared with the technical solution of the related art where the first transfer structure 21 is arranged on the side of the common signal line 20 close to the display area A (as shown in FIG. 1), it can reduce the influence of the electric field generated at the first transfer structure 21 on the liquid crystals in the display area A. That is, it can alleviate the uneven diffusion of liquid crystals around the display area A, and reduce the weak friction area, such that the liquid crystals in the peripheral area of the display area A can be oriented normally, thereby improving the product yield and the display effect.

It should be noted that the aforementioned common signal line 20 and the gate signal line 19 may also not be provided in the same layer as the source electrode 122 and drain electrode 123 of the thin film transistor 12, depending on the specific situation. In the embodiment of the present disclosure, by arranging the common signal line 20 and the gate signal line 19 in the same layer as the source electrode 122 and the drain electrode 123 of the thin film transistor 12, the process steps can be reduced and the cost can be reduced.

In some embodiments, as shown in FIGS. 2 and 4, the peripheral wiring area B may further include a second lead 22. The second lead 22 is arranged on the same layer as the gate electrode 120 of the thin film transistor 12 and is electrically connected to the common electrode 13. Since the common signal line 20 is formed after the gate electrode 120 of the thin film transistor 12 is formed, in order to enable the common signal line 20 to be electrically connected to the common electrode 13 through the second lead 22, the peripheral wiring area B may also include a second transfer structure 23. The common signal line 20 can be electrically connected to the second lead 22 through the second transfer structure 23.

Optionally, as shown in FIG. 2, the second transfer structure 23 may be located on the side of the common signal line 20 away from the display area A, it ensures that the common signal line 20 can transmit signals to the common electrode 13 of the display area A, and it can also increase the distance between the second transfer structure 23 and the display area A, such that the influence of the electric field generated at the second transfer structure 23 on the liquid crystals in the display area A can be reduced. That is, it can alleviate the uneven diffusion of the liquid crystals around the display area A, and reduce the weak friction area, such that the liquid crystals in the peripheral area of the display area A can be oriented normally, thereby improving the product yield and the display effect.

It should be noted that, in order to realize the connection between the second lead 22 and the common electrode 13 in the display area A, a part of the second lead 22 may extend to the display area A. That is, a part of the second lead 22 may be located in the peripheral wiring area B to be electrically connected to the common signal line 20, the other part may be located in the display area A. The portion of the second lead 22 located in the display area A may extend in the second direction X, so as to be electrically connected to the common electrodes 13 of the plurality of pixel units arranged in the second direction X.

The structure of the array substrate of the present disclosure will be described in detail below with reference to the accompanying drawings.

As shown in FIGS. 2 and 4, the first transfer structure 21 may include a first transfer portion 210, at least one first via 211 and at least one second via hole 212. An orthographic projection of the first via hole 211 on the base substrate 11 is located within an orthographic projection of the gate signal line 19 on the base substrate 11, and the first via hole 211 exposes at least a part of the gate signal line 19. An orthographic projection of the second via hole 212 on the base substrate 11 is located within an orthographic projection of the first lead 18 on the base substrate 11, and the second via hole 212 exposes at least a part of the first lead 18. The first transfer portion 210 is located on a side of the gate signal line 19 away from the base substrate 11, wherein the first transfer portion 210 is electrically connected to the gate signal line 19 through the first via hole 211, and is electrically connected to the first lead 18 through the second via hole 212.

Optionally, the first transfer portion 210 may be made of transparent materials such as ITO (Indium Tin Oxide), Indium Zinc Oxide (IZO), and Zinc Oxide (ZnO). The first transfer portion 210 can be arranged in the same layer as the pixel electrode 15, to reduce the processing steps of the array substrate, thereby reducing the cost.

When the first transfer portion 210 and the pixel electrode 15 are arranged in the same layer, the first via hole 211 can penetrate through the second insulating layer 16 and expose the gate signal line 19; and the second via hole 212 can penetrate through the first insulating layer 14 and the second insulating layer 16 and expose the first lead 18.

In some embodiments, the first lead 18 may include a first transfer lead segment 181 extending in the first direction Y and a first main lead segment 180 extending in a second direction X, an orthographic projection of the first transfer lead segment 181 on the base substrate 11 is located between an orthographic projection of the gate signal line 19 on the base substrate 11 and an orthographic projection of the common signal line 20 on the base substrate 11. The first main lead segment 180 is electrically connected to the first transfer lead segment 181 and the gate electrode 120 of the thin film transistor 12 respectively, and an orthographic projection of the first main lead segment 180 on the base substrate 11 overlaps the orthographic projection of the common signal line 20 on the base substrate 11. That is, the first main lead segment 180 strides the common signal line 20.

The orthographic projection of the second via hole 212 on the base substrate 11 is located within the orthographic projection of the first transfer lead segment 181 on the base substrate 11. That is, the first transfer portion 210 can be electrically connected to the first transfer lead segment 181, to realize the electrical connection between the gate signal line 19 and the first lead 18. Since the extension direction of the first transfer lead segment 181 is the same as the extension direction of the gate signal line 19, the connection area between the first transfer portion 210 and the first transfer lead segment 181, the gate signal line 19 is increased, so that the stability of the connection between the first lead 18 and the gate signal line 19 can be ensured.

Optionally, there may be a plurality of first via holes 211 arranged at intervals in the first direction Y; and there may be a plurality of second via holes 212 arranged at intervals in the first direction Y, such design can further improve the connection stability of the gate signal line 19 and the first lead 18.

As shown in FIGS. 2 and 4, the second transfer structure 23 may include a second transfer portion 230, at least one third via hole 231, and at least one fourth via hole 232. An orthographic projection of the third via hole 231 on the base substrate 11 is located within an orthographic projection of the common signal line 20 on the base substrate 11, and the third via hole 231 exposes at least a part of the common signal line 20. An orthographic projection of the fourth via hole 232 on the base substrate 11 is located within an orthographic projection of the first lead 18 on the base substrate 11, and the fourth via hole 232 exposes at least a part of the second lead 22. The second transfer portion 230 is located on a side of the common signal line 20 away from the base substrate 11, the second transfer portion 230 is electrically connected to the common signal line 20 through the third via hole 231, and is electrically connected to the second lead 22 through the fourth via hole 232.

Optionally, the second transfer portion 230 may be made of transparent materials such as ITO (Indium Tin Oxide), Indium Zinc Oxide (IZO), and Zinc Oxide (ZnO). The second transfer portion 230 can be arranged in the same layer as the pixel electrode 15, to reduce the processing steps of the array substrate, thereby reducing the cost.

When the second transfer portion 230 and the pixel electrode 15 are arranged in the same layer, the third via hole 231 can penetrate through the second insulating layer 16 and expose the common signal line 20; and the fourth via hole 232 can penetrate through the first insulating layer 14 and the second insulating layer 16 and expose the second lead 22.

In some embodiments, the second lead 22 may include a second transfer lead segment 221 extending in the first direction Y and a second main lead segment 220 extending in a second direction X, an orthographic projection of the second transfer lead segment 221 on the base substrate 11 is located between an orthographic projection of the gate signal line 19 on the base substrate 11 and an orthographic projection of the common signal line 20 on the base substrate 11. The second main lead segment 220 is electrically connected to the second transfer lead segment 221 and the common electrode 13 respectively, and an orthographic projection of the second main lead segment 220 on the base substrate 11 overlaps the orthographic projection of the common signal line 20 on the base substrate 11. That is, the second main lead segment 220 strides the common signal line 20.

The orthographic projection of the fourth via hole 232 on the base substrate 11 is located within the orthographic projection of the second transfer lead segment 221 on the base substrate 11. That is, the second transfer portion 230 can be electrically connected to the second transfer lead segment 221, to realize the electrical connection between the common signal line 20 and the second lead 22. Since the extension direction of the second transfer lead segment 221 is the same as the extension direction of the common signal line 20, the connection area between the second transfer portion 230 and the second transfer lead segment 221, the common signal line 20 is increased, so that the stability of the connection between the second lead 22 and the common signal line 20 can be ensured.

Optionally, there may be a plurality of third via holes 231 arranged at intervals in the first direction Y; and there may be a plurality of fourth via holes 232 arranged at intervals in the first direction Y, such design can further improve the connection stability of the common signal line 20 and the second lead 22.

It should be noted that the base substrate 11 in the array substrate of the embodiment of the present disclosure may be a single-layer structure or a multi-layer structure; and the base substrate 11 may be a rigid substrate such as glass, or the base substrate 11 may be a flexible substrate made of materials such as polyimide (PI), which is not specifically limited in the embodiments of the present disclosure.

It should be noted that the array substrate in the embodiment of the present disclosure is mainly used in liquid crystal display products. In order to ensure the light transmittance of the product, the base substrate 11, and the insulating layer such as the first insulating layer 14 and the second insulating layer 16 in the array substrate can be made into a transparent state. Therefore, although FIG. 2 in the embodiment of the present disclosure does not mark the base substrate 11, the first insulating layer 14, and the second insulating layer 16 shown in FIGS. 3 and 4, it does not prevent those skilled in the art from thinking about the positions of the base substrate 11, the first insulating layer 14, and the second insulating layer 16 in FIG. 2.

An embodiment of the present disclosure also provides a display apparatus, which includes the array substrate described in any of the above embodiments. The display apparatus may be a liquid crystal display apparatus.

According to the embodiments of the present disclosure, the specific type of the display apparatus is not particularly limited. The types of display apparatuses commonly used in the field can be used, such as liquid crystal display screens, mobile devices such as mobile phones and notebook computers, wearable devices such as watches, and VR devices, which can be selected by those skilled in the art according to the specific purpose of the display device, and will not be repeated herein.

It should be noted that in addition to the array substrate, the display apparatus also includes other necessary components and parts. Taking the display as an example, it may also include a color film substrate, liquid crystal molecules located in the display area, an outer housing, a main circuit board, and a power cord, or the like. Those skilled in the art can make corresponding supplements according to specific usage requirements of the display apparatus, which will not be repeated herein.

Figure 5:
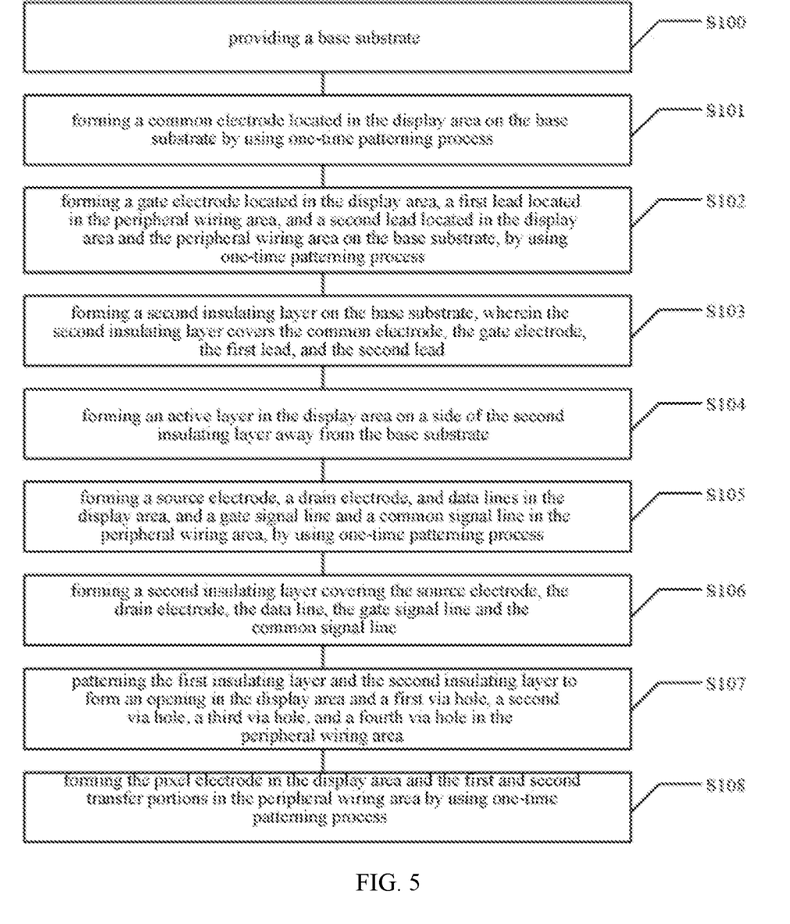
FIG. 5 shows a flow chart of a manufacturing method of an array substrate provided by an embodiment of the present disclosure.

In addition, the embodiments of the present disclosure further provide a manufacturing method of an array substrate. The structure of the array substrate can refer to the structure of the array substrate described in the foregoing embodiments, which will not be described herein. As shown in FIG. 5, The manufacturing method may include:

S100, providing a base substrate;

S101, forming a common electrode located in the display area on the base substrate by using an one-time patterning process;

S102, forming a gate electrode located in the display area, a first lead located in the peripheral wiring area, and a second lead located in the display area and the peripheral wiring area on the base substrate, by using an one-time patterning process, wherein the first lead is electrically connected to the gate electrode, and the second lead is electrically connected to the common electrode;

S103, forming a second insulating layer on the base substrate, wherein the second insulating layer covers the common electrode, the gate electrode, the first lead, and the second lead;

S104, forming an active layer in the display area on a side of the second insulating layer away from the base substrate;

S105, forming a source electrode, a drain electrode, and data lines in the display area, and a gate signal line and a common signal line in the peripheral wiring area, by using an one-time patterning process, wherein the source electrode and the drain electrode are located on two sides of the active layer and are electrically connected to the active layer, and the data line is electrically connected to the source electrode;

S106, forming a second insulating layer covering the source electrode, the drain electrode, the data line, the gate signal line and the common signal line;

S107, patterning the first insulating layer and the second insulating layer to form an opening in the display area and a first via hole, a second via hole, a third via hole, and a fourth via hole in the peripheral wiring area, wherein the opening exposes at least a part of the drain electrode, the first via hole exposes at least part of the gate signal line, the second via hole exposes at least a part of the first lead, the third via hole exposes at least a part of the common signal line, and the fourth via hole exposes the second lead; and S108, forming the pixel electrode in the display area and the first and second transfer portions in the peripheral wiring area by using an one-time patterning process, wherein the pixel electrode is electrically connected to the drain electrode through the opening; the first transfer portion is electrically connected to the gate signal line and the first lead respectively through the first via hole and the second via hole, and the second transfer portion is electrically connected to the common signal line and the second lead respectively through the third via hole and the fourth via hole.

It should be understood that the above-mentioned manufacturing method provided by the embodiment of the present disclosure should have the same characteristics and advantages as the array substrate provided by the embodiment of the present disclosure. Therefore, the characteristics and advantages of the above-mentioned manufacturing method provided by the embodiment of the present disclosure can refer to the characteristics and advantages of the array substrate described above, details are not repeated herein.

It should be noted that although the various steps of the method in the present disclosure are described in a specific order in the drawings, this does not require or imply that these steps must be performed in the specific order, or that all the steps shown must be performed to achieve the desired the result. Additionally or alternatively, some steps may be omitted, multiple steps may be combined into one step for execution, and/or one step may be decomposed into multiple steps for execution, or the like. In addition, some of the above steps can be executed in parallel or sequentially, etc., which is not limited to the specific operation sequence described above.

Those skilled in the art will easily think of other embodiments of the present disclosure after considering the specification and practicing the content disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and embodiments are only regarded as exemplary, and the true scope and spirit of the present disclosure are indicated by the claims.

What is claimed is:

1. An array substrate, having a display area and a peripheral wiring area provided at at least one side of the display area, wherein the array substrate comprises a base substrate, and the display area comprises a thin film transistor and a common electrode formed on the base substrate; the peripheral wiring area comprises a first lead, a gate signal line and a common signal line formed on the base substrate;

the thin film transistor comprises a gate electrode, and the first lead and the gate electrode are arranged in an identical layer and are electrically connected;

the gate signal line is located on a side of the first lead away from the base substrate, and is electrically connected to the first lead through a first transfer structure;

the common signal line is located on a side of the first lead away from the base substrate and located on a side of the gate signal line close to the display area, and the common signal line is electrically connected to the common electrode, wherein, the first transfer structure is located on a side of the common signal line away from the display area, wherein the peripheral wiring area further comprises a second lead formed on the base substrate, and the second lead is provided on an identical layer with the gate electrode and is electrically connected to the common electrode;

the common signal line is electrically connected to the second lead through a second transfer structure, wherein the second transfer structure is closer to the display area than the first transfer structure, wherein the second transfer structure comprises:

at least one third via hole, wherein an orthographic projection of the third via hole on the base substrate is located within an orthographic projection of the common signal line on the base substrate, and the third via hole exposes at least a part of the common signal line;

at least one fourth via hole, wherein an orthographic projection of the fourth via hole on the base substrate is located within an orthographic projection of the second lead on the base substrate, and the fourth via hole exposes at least a part of the second lead;

a second transfer portion, located on a side of the common signal line away from the base substrate, wherein the second transfer portion is electrically connected to the common signal line through the third via hole, and is electrically connected to the second lead through the fourth via hole.

2. The array substrate according to claim 1, wherein the common signal line and the gate signal line extend in a first direction;

the first lead comprises a first transfer lead segment extending in the first direction and a first main lead segment extending in a second direction, an orthographic projection of the first transfer lead segment on the base substrate is located between an orthographic projection of the gate signal line on the base substrate and an orthographic projection of the common signal line on the base substrate; the first main lead segment is electrically connected to the first transfer lead segment and the gate electrode of the thin film transistor respectively, and an orthographic projection of the first main lead segment on the base substrate overlaps the orthographic projection of the common signal line on the base substrate, wherein, the orthographic projection of the second via hole on the base substrate is located within the orthographic projection of the first transfer lead segment on the base substrate; and the second direction intersects with the first direction.

3. The array substrate according to claim 2, wherein, a plurality of the first via holes are provided and arranged at intervals in the first direction;

a plurality of the second via holes are provided and arranged at intervals in the first direction.

4. The array substrate according to claim 1, wherein, the display area further comprises a pixel electrode, the thin film transistor comprises a drain electrode, and the pixel electrode is located on a side of the drain electrode away from the base substrate and is connected to the drain electrode of the thin film transistor;

the second transfer portion and the pixel electrode are provided in an identical layer.

5. The array substrate according to claim 1, wherein, the thin film transistor comprises a source electrode and a drain electrode, and the gate signal line, the common signal line, the source electrode and the drain electrode are arranged in an identical layer.

6. The array substrate according to claim 1, wherein an insulating material layer is provided between the common signal line and the first lead.

7. The array substrate according to claim 1, wherein width of the gate signal line in the peripheral wiring area and width of a gate signal line connected to the gate electrode in the display area are different.

8. The array substrate according to claim 7, wherein as for an identical gate signal line, the width of the gate signal line in at least part of the display area is greater than the width of the gate signal line in the peripheral wiring area.

9. The array substrate according to claim 1, wherein the common signal line and the gate signal line extend in the first direction;

the second lead comprises a second transfer lead segment extending in the first direction and a second main lead segment extending in a second direction, an orthographic projection of the second transfer lead segment on the base substrate is located between an orthographic projection of the gate signal line on the base substrate and an orthographic projection of the common signal line on the base substrate; the second main lead segment is electrically connected to the second transfer lead segment and the common electrode respectively, and an orthographic projection of the second main lead segment on the base substrate overlaps the orthographic projection of the common signal line on the base substrate, wherein, the orthographic projection of the fourth via hole on the base substrate is located within the orthographic projection of the second transfer lead segment on the base substrate; and the second direction intersects with the first direction.

10. The array substrate according to claim 9, wherein, a plurality of the third via holes are provided and arranged at intervals in the first direction;

a plurality of the fourth via holes are provided and arranged at intervals in the first direction.

11. A display apparatus, comprising an array substrate, wherein the array substrate has a display area and a peripheral wiring area provided at at least one side of the display area, the array substrate comprises a base substrate, and the display area comprises a thin film transistor and a common electrode formed on the base substrate; the peripheral wiring area comprises a first lead, a gate signal line and a common signal line formed on the base substrate;

the thin film transistor comprises a gate electrode, and the first lead and the gate electrode are arranged in an identical layer and are electrically connected;

the gate signal line is located on a side of the first lead away from the base substrate, and is electrically connected to the first lead through a first transfer structure;

the common signal line is located on a side of the first lead away from the base substrate and located on a side of the gate signal line close to the display area, and the common signal line is electrically connected to the common electrode, wherein, the first transfer structure is located on a side of the common signal line away from the display area, wherein the peripheral wiring area further comprises a second lead formed on the base substrate, and the second lead is provided on an identical layer with the gate electrode and is electrically connected to the common electrode;

the common signal line is electrically connected to the second lead through a second transfer structure, wherein the second transfer structure is closer to the display area than the first transfer structure, wherein the second transfer structure comprises:

at least one third via hole, wherein an orthographic projection of the third via hole on the base substrate is located within an orthographic projection of the common signal line on the base substrate, and the third via hole exposes at least a part of the common signal line;

at least one fourth via hole, wherein an orthographic projection of the fourth via hole on the base substrate is located within an orthographic projection of the second lead on the base substrate, and the fourth via hole exposes at least a part of the second lead;

a second transfer portion, located on a side of the common signal line away from the base substrate, wherein the second transfer portion is electrically connected to the common signal line through the third via hole, and is electrically connected to the second lead through the fourth via hole.

12. The display apparatus according to claim 11, wherein the common signal line and the gate signal line extend in a first direction;

the first lead comprises a first transfer lead segment extending in the first direction and a first main lead segment extending in a second direction, an orthographic projection of the first transfer lead segment on the base substrate is located between an orthographic projection of the gate signal line on the base substrate and an orthographic projection of the common signal line on the base substrate; the first main lead segment is electrically connected to the first transfer lead segment and the gate electrode of the thin film transistor respectively, and an orthographic projection of the first main lead segment on the base substrate overlaps the orthographic projection of the common signal line on the base substrate, wherein, the orthographic projection of the second via hole on the base substrate is located within the orthographic projection of the first transfer lead segment on the base substrate; and the second direction intersects with the first direction.

13. The display apparatus according to claim 12, wherein, a plurality of the first via holes are provided and arranged at intervals in the first direction;

a plurality of the second via holes are provided and arranged at intervals in the first direction.

14. The display apparatus according to claim 11, wherein the common signal line and the gate signal line extend in the first direction;

the second lead comprises a second transfer lead segment extending in the first direction and a second main lead segment extending in a second direction, an orthographic projection of the second transfer lead segment on the base substrate is located between an orthographic projection of the gate signal line on the base substrate and an orthographic projection of the common signal line on the base substrate; the second main lead segment is electrically connected to the second transfer lead segment and the common electrode respectively, and an orthographic projection of the second main lead segment on the base substrate overlaps the orthographic projection of the common signal line on the base substrate, wherein, the orthographic projection of the fourth via hole on the base substrate is located within the orthographic projection of the second transfer lead segment on the base substrate; and the second direction intersects with the first direction.

15. The array substrate according to claim 14, wherein, a plurality of the third via holes are provided and arranged at intervals in the first direction;

a plurality of the fourth via holes are provided and arranged at intervals in the first direction.

* * * * *